(12) United States Patent  (10) Patent No.: US 8,587,228 B2
Anderson  (45) Date of Patent: Nov. 19, 2013

(54) WIRELESS CONTROLLED VARIABLE SPEED DIRECT CURRENT MOTOR

(76) Inventor: Gregory Paul Anderson, Dassel, MN (US)

( * ) Notice: Subject to any disclaimer, the term of this patent is extended or adjusted under 35 U.S.C. 154(b) by 550 days.

(21) Appl. No.: 12/858,262

(22) Filed: Aug. 17, 2010

(65) Prior Publication Data

US 2011/0043155 A1    Feb. 24, 2011

Related U.S. Application Data

(60) Provisional application No. 61/234,703, filed on Aug. 18, 2009.

(51) Int. Cl.
*G05D 1/02* (2006.01)
*H04Q 7/00* (2006.01)

(52) U.S. Cl.
USPC ................. 318/16; 318/599; 318/811

(58) Field of Classification Search
USPC ............................................. 318/16, 599, 811
See application file for complete search history.

(56) References Cited

U.S. PATENT DOCUMENTS

| 4,334,221 | A * | 6/1982 | Rosenhagen et al. | 463/6 |
| 8,013,550 | B1 * | 9/2011 | Young et al. | 318/268 |
| 8,154,227 | B1 * | 4/2012 | Young et al. | 318/255 |
| 8,226,374 | B2 * | 7/2012 | Peterson et al. | 417/46 |
| 2002/0177920 | A1 * | 11/2002 | Kasagami et al. | 700/170 |

* cited by examiner

*Primary Examiner* — Erick Glass
(74) *Attorney, Agent, or Firm* — Sinorica, LLC (57) ABSTRACT

A remote and receiver system that allows user control over current output to a direct current motor. The control of current output grants users the ability to control the speed of rotation of a direct current motor. A speed controlled direct current motor can be utilized to control motor speeds within system such as a salt spreader. This can give users control over the flow rate and the spreading area of the salt.

14 Claims, 6 Drawing Sheets

WIRELESS CONTROLLED VARIABLE SPEED DIRECT CURRENT MOTOR

The current application claims a priority to the U.S. Provisional Patent application Ser. No. 61/234,703 filed on Aug. 18, 2009.

FIELD OF THE INVENTION

The present invention relates generally to motor and remote system. More specifically a direct current motor with variable rotation speed controlled by a wireless remote device.

BACKGROUND OF THE INVENTION

The direct current electric motors are used in a wide variety of applications including industrial products, portable conveying systems, power units, or compressors and more. In addition, applications such as mobile de-icing spreaders, the direct current motor is typically directly hardwired to a controlling system. However, this is often times inconvenient to set up and requires different cables and wires to be pulled around. The present invention overcomes this inconvenience by introducing a system that allows users to remotely adjust the amount of current passing through the direct current motor operating the devices such as conveyors to control the speed of the motor or the motor of a salt/de-icing spreader for controlling spreading rate. The control is achieved without the use of cables by means of a wireless transmitter and receiver system.

DETAIL DESCRIPTIONS OF THE INVENTION

All illustrations of the drawings are for the purpose of describing selected versions of the present invention and are not intended to limit the scope of the present invention. The present invention is a direct current electric motor that is controlled by a remote control system to operate a mobile de-icing spreader.

Figure 3:
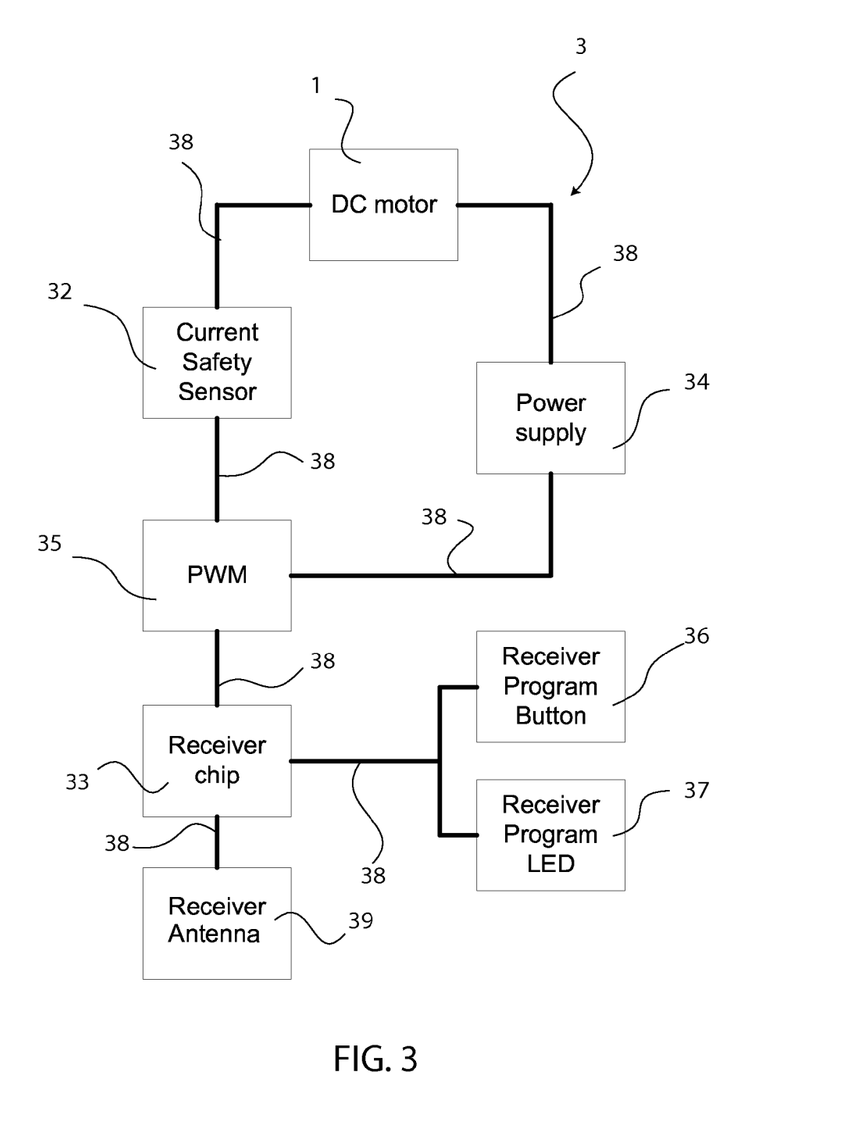
FIG. 3 is a diagram showing the relationship and interactions between each component within the receiving circuit unit.
Figure 4:
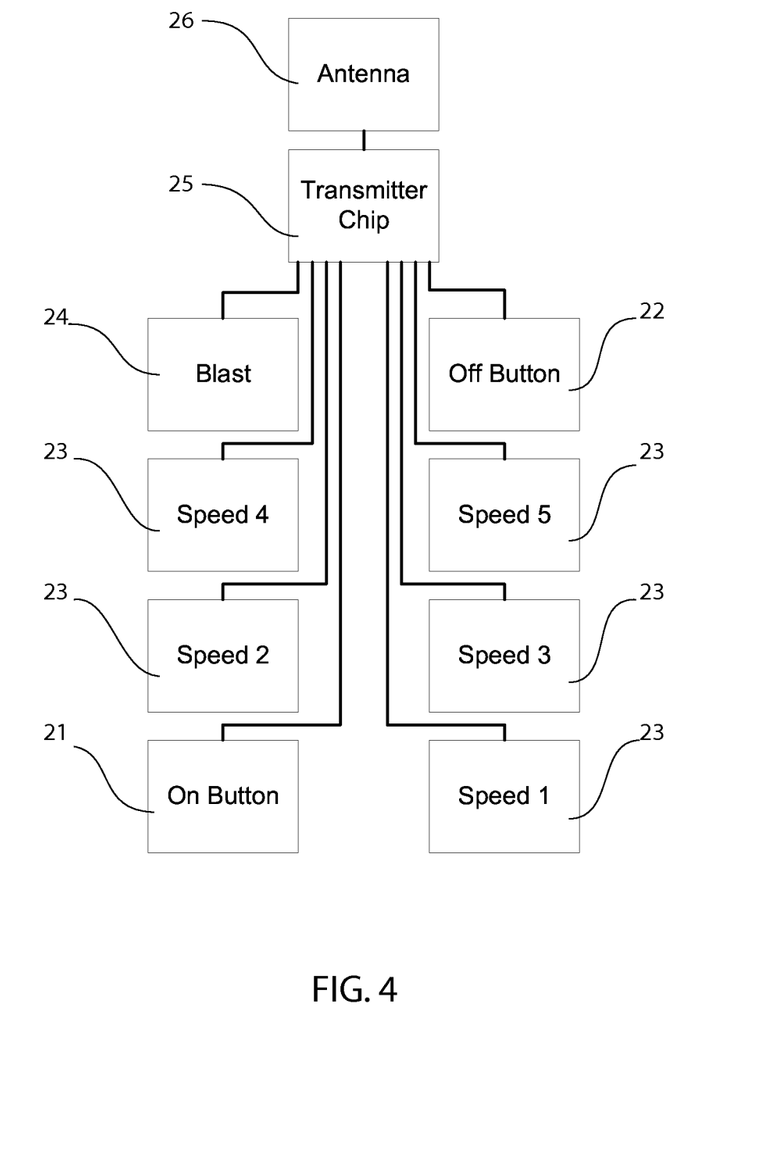
FIG. 4 is a diagram of the labeled transmitter outputs related to the control input of the present invention used in a mobile de-icing spreader application.

In reference to FIG. 3 and FIG. 4, the present invention mainly comprises of a direct current motor 1, a controller input transmitter 2, and a receiving circuit unit 3. The controller input transmitter 2 is a remote device that comprises of a power-on button 21, a power-off button 22, a plurality of speed control buttons 23, a blast button 24, a transmitter chip 25, a transmitter antenna 26, a transmitter program button 27, and a transmitter program LED 28. The receiving circuit unit 3 comprises of a cover 31, a current safety sensor circuitry 32, a receiver chip 33, a power supply 34, a pulse-width modulation output controller 35, receiver program button 36, at least one connector 38, and a receiver antenna 39. The direct current motor 1 in the present invention is a 12 volt direct current motor.

In reference to FIG. 4, the controller input transmitter 2 is a remote wireless device that is able to send signals to the receiving circuit unit 3 to control the activity of the direct current motor 1. To activate the receiving circuit unit 3 the user must depress the power-on button 21. To deactivate the receiving circuit unit 3 the user must depress the power-off button 22. The controller input transmitter 2 allows the user to control the amount of current flow through the direct current motor 1 by means of the plurality of speed control buttons 23 on the face of the controller input transmitter 2. As a user depresses the power-on button 21, the power-off button 22, the plurality of speed control buttons 23, and the blast button 24 on the controller input transmitter 2, the plurality of speed control buttons 23 will relay a signal through the transmitter chip 25 to the receiving circuit unit 3. The transmitter chip 25 is positioned inside the controller input transmitter 2 and is connected to the transmitting antenna 22. The transmitting antenna 22 amplifies the signal being emitted by the transmitter chip 25 to ensure the signal is able to reach the receiving circuit unit 3. The transmitter antenna 26 is a protruding transducer that is able to convert the electric signal received by the transmitter chip 25 into an encoded electromagnetic radiation signal. The power-on button 21 can also be used to stop the direct current motor 1 from running without turning off the receiving circuit unit 3. In the preferred embodiment of the present invention, the plurality of speed control buttons 23 are depressed to control the rotation speed of the direct current motor 1 ranging from a fraction of the full speed to the maximum speed of the direct current motor 1. The blast button 24 on the controller input transmitter 2 allows the user to run the direct current motor 1 at full speed for 6 to 8 seconds then auto shut down.

In reference to FIG. 3, the receiving circuit unit 3 is a controlling circuit that is connected to the direct current motor 1 by the at least one connector 38. The receiver chip 33 of the receiving circuit unit 3 works in tandem with and only recognizes signals from the transmitter chip 25. The receiver chip 33 is connected directly to the pulse-width modulation output controller 35 and the receiver antenna 39 by the at least one connector 38. The power supply 34 is able to provide steady energy for the entire circuit as well as the direct current motor 1. However, the amount of energy the power supply 34 is providing the direct current motor 1 is controlled by the pulse-width modulation output controller 35. The receiver chip 33 will relay the encoded signal received through the receiving antenna 39 from the transmitting antenna 26 and transmitter chip 25 from the controller input transmitter 2 directly to the pulse-width modulation output controller 35. The pulse-width modulation output controller 35 will recognize the signal and output a pre-set current to the direct current motor 1. The pulse-width modulation output controller 35 will have a plurality of pre-designed current outputs. The current will directly control the rotation speed of the direct current motor 1. The direct current motor 1 is able to proportionally convert the amount of electrical current received from the receiving circuit unit 3 into mechanical energy which can be used for a variety of applications. With a plurality of pre-designed current outputs, the direct current motor 1 will be able to run at different rotations per minute. The pre-designed current output of the receiving circuit unit 3 can be hardware and/or in-house written software controlled. With increased current output by the receiving circuit unit 3, the rotation speed of the direct current motor 1 will increase. With decreased current output by the receiving circuit unit 3, the rotation speed of the direct current motor 1 will decrease. Additionally, the pulse-width modulation output controller is attached to heat sinks as they tend to rise in temperature from switching on and off transistors.

To protect the direct current motor 1 and the circuitry of the receiving circuit unit 3, the receiving circuit unit 3 integrates the current safety sensor circuitry 32. The current safety sensor circuitry 32 is connected to the direct current motor 1 and the pulse-width modulation output controller 35. The current safety sensor circuitry 32 is able to automatically shut down the receiving circuit unit 3 if it senses a current draw of more than 175 to 200 amps for more than approximately 1000 mS. The current safety sensor circuitry 32 will be able to shut down the receiving circuit unit 3 within 1 to 30 seconds. Additionally, if the current safety sensor circuitry 32 senses that the circuit current draw does not drop below 75 amps after 5 to 6 seconds, the receiving circuit unit 3 will shut down within 1 to 30 seconds as well. The current safety sensor circuitry 32 senses a total current output by means of charging capacitors that are connected to the receiving circuit unit 3 that switches the output on or off depending on the current output. If the current output does not drop to an acceptable safety limit, the current safety sensor circuitry 32 will shut down the entire present invention to prevent damage to the any circuitry.

Figure 1:
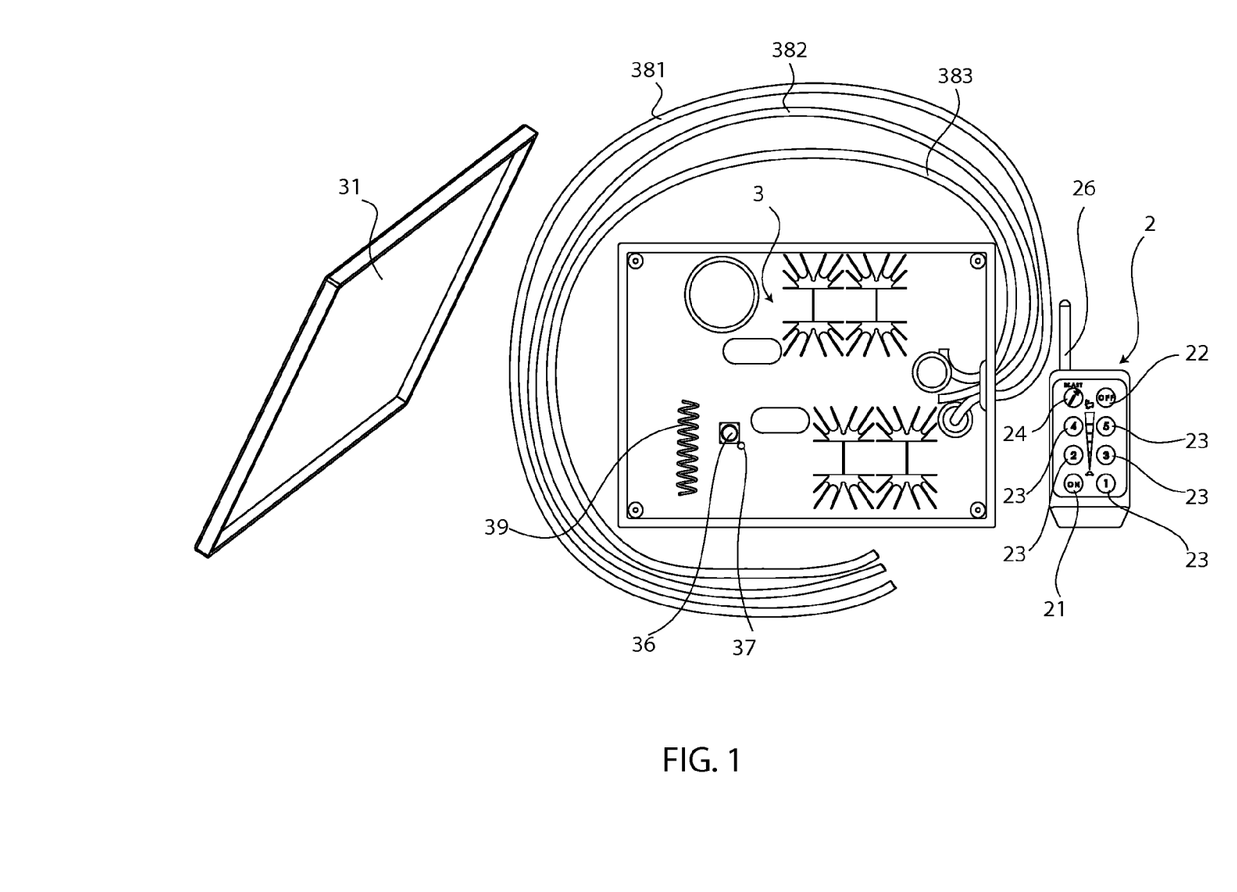
FIG. 1 is a picture of the present invention showing a portion of the receiving circuit unit along with the transmitter as used in a mobile de-icing spreader application. The open receiver box reveals the receiver program button and the receiver program LED. Additionally, the diagram shows wires extending out for connection to a DC motor for controlling current output. These are power, ground, and current output respectively.
Figure 2:
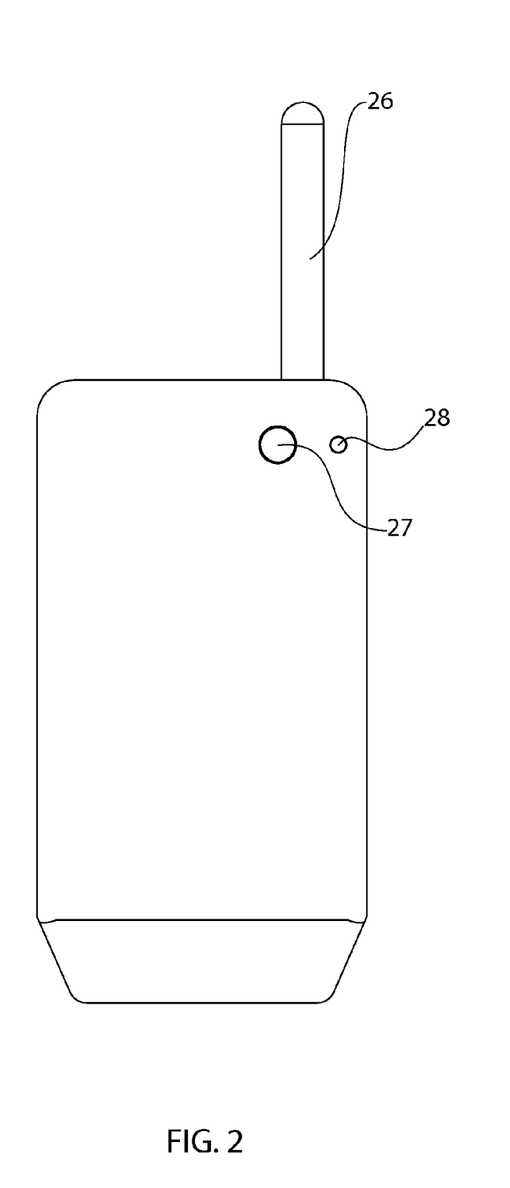
FIG. 2 is a rear elevational view of the transmitter showing the transmitter program button and the transmitter program LED.

In reference to FIG. 1 and FIG. 3, to program the transmitter chip 25 and receiver chip 33 to only recognize each other's signal. The following procedure is required to set up a unique address between the transmitter chip 25 and receiver chip 33. The first step requires the user to disconnect the direct current motor 1 from the pulse-width modulation output controller 35. In most applications it is located on the rear of the controller input transmitter 2 are the transmitter program button 27 and the transmitter program LED 28. The user will depress the transmitter program button 27, causing the transmitter program LED 28 to begin blinking for 15 seconds. During the 15 seconds that the transmitter program LED 28 is blinking, the user will need to flip the controller input transmitter 2 over and firmly depress all of the buttons beginning with the power-on button 21. Once all of the buttons have been depressed, the transmitter will acquire a 1 in 16 million address. Next, the receiver chip 33 is matched to the transmitter chip 25. The user will remove the cover 31 of the receiving circuit unit 3 to access the circuitry of the receiving circuit unit 3. The user must connect the unit to with the at least one connector 38 for power and one for ground to the power supply 34. More specifically, the at least one connector 38 for the receiving circuit unit 3 comprises of a ground connector 381, a power connector 382, and a PWM output connector 383. The power connector 382 is connected for providing power to all of the components of the receiving circuit unit 3. The PWM output connector 383 relays the amount of current that is allowed to the direct current motor 1. The ground connector 381 is a safety measure connected to circuitry to the direct current motor 1 and the receiving circuit unit 3 to prevent buildup of static electricity. Within the receiving circuit unit 3 is the receiver program button 36 and the receiver program LED 37. To match receiver chip 33 to the transmitter chip 25, the user is to depress the receiver program button 36. This will cause the receiver program LED 37 to begin blinking for 15 seconds. During the 15 seconds of blinking, the user is required to firmly depress the power-on button 21 on the controller input transmitter 2 to allow the receiver chip 33 to only recognize the unique address of the transmitter chip 25. Once linked, the user is to depress the power-off button 22 on the controller input transmitter 2 to deactivate the receiver circuit unit to allow reconnection of the pulse-width modulation output controller 35 with the direct current motor 1.

With a remote controller input transmitter 2 and a receiving circuit unit 3 communicating wirelessly, the present invention eliminates any type of hard-wired connection required for signal transmission to control current output to the direct current motor 1.

Figure 5:
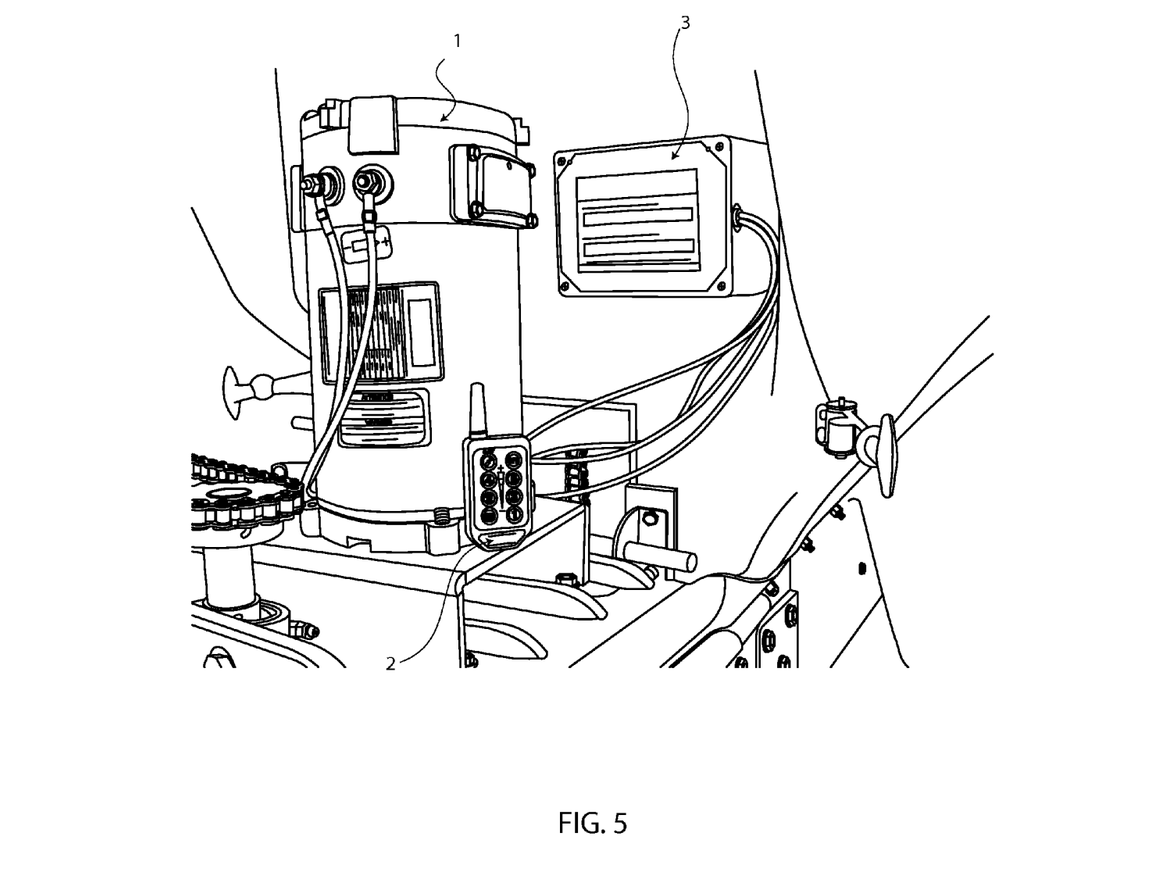
FIG. 5 is a diagram of the present invention shown together with a de-icing salt spreader on the bed of a truck.
Figure 6:
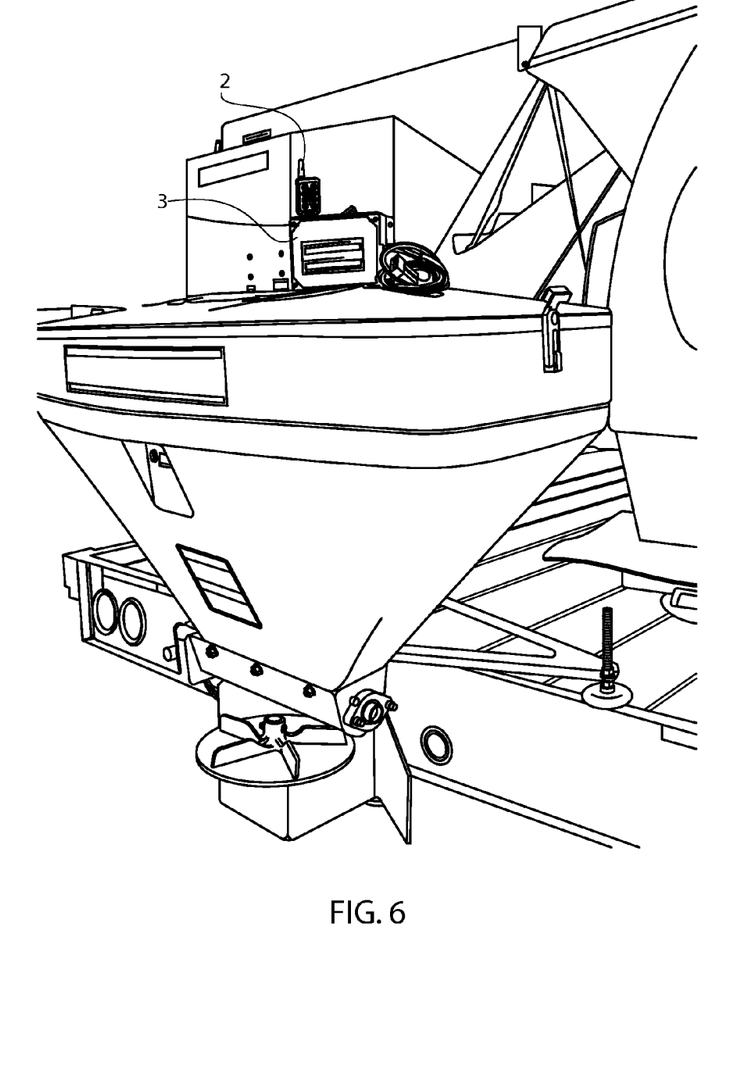
FIG. 6 is a diagram of the present invention implemented with a de-icing spreader machine.

As shown in FIG. 5 and FIG. 6, the direct current motor 1 can be directly connected to a spreading machine. The de-icing spreader is a machine such as a salt spreader which can disperse particles such as sand or salt in even amounts. To control the flow rate of the particles in the process of spreading, the spreading machine will have a spinner and a conveyor. The conveyor determines the flow rate at which the spreading machine will disperse the salt. The spinner speed determines how much radius the salt spreading machine is spreading the salt or other de-icing material to the surface to be de-iced. If the spinner rotates at a faster rate, the radius of salt being spread will increase to cover larger areas. In some cases a direct current motor will drive the conveyor and the spinner simultaneously. In other applications the spreading system can utilize dual motors. A first motor can be used to drive the conveyor to pull salt from a container device and a second motor to drive the spinner for spreading of salt. These traditional spreaders are directly connected to a motor that is hardwired to the wired remote control for speed control. However, the present invention allows a user to control the speed of the motor without being directly wired to control the rate at which salt/sand or other type of de-icing material is being dispersed.

The present invention can also be utilized in different applications as well. The usages include the controlling of DC motor powered hydraulic pumps at different speeds or even air compressors/blowers that need adjustment of air pressure at different speeds. The wireless remote control for a DC motor speed adjustment can be utilized in many different applications for more convenience to the user. The present invention eliminates the hassle of sorting out different cables and lines that are limited in length.

Although the invention has been explained in relation to its preferred embodiment, it is to be understood that many other possible modifications and variations can be made without departing from the spirit and scope of the invention as hereinafter claimed.

What is claimed is:

1. A wireless controlled variable speed direct current motor comprises,
   a direct current motor;
   a controller input transmitter;
   a receiving circuit unit;
   the controller input transmitter comprises a power-on button, a power-off button, a plurality of speed control buttons, a blast button, a transmitter chip, a transmitting antenna, a transmitter program button, and a transmitter program LED;
   the receiving circuit unit comprises a cover, a current safety sensor circuitry, a receiver chip, a power supply, pulse-width modulation output controller, a receiver program button, a receiver program LED, receiver antenna and at least one connector; the at least one connector comprises of a power connector, a ground connector, and a PWM output connector;

the direct current motor being connected to the power supply and the current safety sensor circuitry by the at least one connector and the power connector;

the pulse-width modulation output being connected to the current safety sensor and the power supply by the PWM output connector and the power connector; and the receiver chip being connected to the receiver antenna, the pulse-width modulation output controller, the receiver program button and the receiver program LED by the at least one connector.

2. The wireless controlled variable speed direct current motor as claimed as in claim 1 comprises, the direct current motor being a 12 to 24 volt direct current motor;

the transmitting chip being only recognizable by the receiver chip;

the receiver chip relaying encoded signals received from the transmitter chip and transmitter antenna to the pulse-width modulation output controller; and the pulse-width modulation output controller outputting pre-set current flow to the direct current motor to control rotational speed.

3. The wireless controlled variable speed direct current motor as claimed as in claim 2 comprises, the cover being a removable plate sealing the receiving circuit unit.

4. The wireless controlled variable speed direct current motor as claimed as in claim 1 comprises, the transmitter chip being positioned inside the controller input transmitter;

the transmitter chip being connected to the transmitting antenna;

the power-on button being positioned on the front face of the controller input transmitter;

the power-off button being positioned on the front face of the controller input transmitter;

the plurality of speed control buttons being positioned on the front face of the controller input transmitter;

the blast button being positioned on the front face of the controller input transmitter;

the transmitter program button being positioned on the rear of the controller input transmitter; and the transmitter program LED being positioned on the rear of the controller input transmitter beside the transmitter program button.

5. The wireless controlled variable speed direct current motor as claimed as in claim 4 comprises, the power-on button being connected to the transmitter chip;

the power-off button being connected to the transmitter chip;

the plurality of speed control buttons being connected to the transmitter chip;

the blast button being connected to the transmitter chip;

the transmitter chip emitting encoded signals through the transmitting antenna;

the transmitting antenna being a protruding transducer from the controller input transmitter; and the transmitting antenna amplifying the encoded signal from the transmitter chip to the receiver chip.

6. A wireless controlled variable speed direct current motor comprises, a direct current motor;

a controller input transmitter;

a receiving circuit unit;

the controller input transmitter comprises a power-on button, a power-off button, a plurality of speed control buttons, a blast button, a transmitter chip, a transmitting antenna, a transmitter program button, and a transmitter program LED;

the receiving circuit unit comprises a cover, a current safety sensor circuitry, a receiver chip, a power supply, pulse-width modulation output controller, a receiver program button, a receiver program LED, receiver antenna and at least one connector;

the at least one connector comprises of a power connector, a ground connector, and a PWM output connector;

the transmitter chip being positioned inside the controller input transmitter;

the transmitter chip being connected to the transmitting antenna;

the transmitter program button being positioned on the rear of the controller input transmitter;

the transmitter program LED being positioned on the rear of the controller input transmitter beside the transmitter program button;

the power-on button being connected to the transmitter chip;

the power-off button being connected to the transmitter chip;

the plurality of speed control buttons being connected to the transmitter chip;

the blast button being connected to the transmitter chip;

the direct current motor being connected to the power supply and the current safety sensor circuitry by the at least one connector and the power connector;

the pulse-width modulation output being connected to the current safety sensor and the power supply by the PWM output connector and the power connector; and the receiver chip being connected to the receiver antenna, the pulse-width modulation output controller, the receiver program button and the receiver program LED by the at least one connector.

7. The wireless controlled variable speed direct current motor as claimed as in claim 6 comprises, the direct current motor being a 12 to 24 volt direct current motor;

the transmitting chip being only recognizable by the receiver chip;

the receiver chip relaying encoded signals received from the transmitter chip and transmitter antenna to the pulse-width modulation output controller; and the pulse-width modulation output controller outputting pre-set current flow to the direct current motor to control rotational speed.

8. The wireless controlled variable speed direct current motor as claimed as in claim 7 comprises, the cover being a removable plate sealing the receiving circuit unit.

9. The wireless controlled variable speed direct current motor as claimed as in claim 6 comprises, the power-on button being positioned on the front face of the controller input transmitter;

the power-off button being positioned on the front face of the controller input transmitter;

the plurality of speed control buttons being positioned on the front face of the controller input transmitter; and the blast button being positioned on the front face of the controller input transmitter.

10. The wireless controlled variable speed direct current motor as claimed as in claim 9 comprises, the transmitter chip emitting encoded signals through the transmitting antenna;

the transmitting antenna being a protruding transducer from the controller input transmitter; and the transmitting antenna amplifying the encoded signal from the transmitter chip to the receiver chip.

11. A wireless controlled variable speed direct current motor comprises, a direct current motor;

a controller input transmitter;

a receiving circuit unit;

the controller input transmitter comprises a power-on button, a power-off button, a plurality of speed control buttons, a blast button, a transmitter chip, a transmitting antenna, a transmitter program button, and a transmitter program LED;

the receiving circuit unit comprises a cover, a current safety sensor circuitry, a receiver chip, a power supply, pulse-width modulation output controller, a receiver program button, a receiver program LED, receiver antenna and at least one connector;

the at least one connector comprises of a power connector, a ground connector, and a PWM output connector;

the transmitter chip being positioned inside the controller input transmitter;

the transmitter chip being connected to the transmitting antenna;

the transmitter program button being positioned on the rear of the controller input transmitter;

the transmitter program LED being positioned on the rear of the controller input transmitter beside the transmitter program button;

the transmitter chip emitting encoded signals through the transmitting antenna;

the transmitting antenna being a protruding transducer from the controller input transmitter;

the transmitting antenna amplifying the encoded signal from the transmitter chip to the receiver chip;

the direct current motor being connected to the power supply and the current safety sensor circuitry by the at least one connector and the power connector;

the pulse-width modulation output being connected to the current safety sensor and the power supply by the PWM output connector and the power connector;

the receiver chip being connected to the receiver antenna, the pulse-width modulation output controller, the receiver program button and the receiver program LED by the at least one connector;

the power-on button being positioned on the front face of the controller input transmitter;

the power-off button being positioned on the front face of the controller input transmitter;

the plurality of speed control buttons being positioned on the front face of the controller input transmitter; and the blast button being positioned on the front face of the controller input transmitter.

12. The wireless controlled variable speed direct current motor as claimed as in claim 11 comprises, the direct current motor being a 12 to 24 volt direct current motor;

the transmitting chip being only recognizable by the receiver chip;

the receiver chip relaying encoded signals received from the transmitter chip and transmitter antenna to the pulse-width modulation output controller; and the pulse-width modulation output controller outputting pre-set current flow to the direct current motor to control rotational speed.

13. The wireless controlled variable speed direct current motor as claimed as in claim 12 comprises, the cover being a removable plate sealing the receiving circuit unit.

14. The wireless controlled variable speed direct current motor as claimed as in claim 11 comprises, the power-on button being connected to the transmitter chip;

the power-off button being connected to the transmitter chip;

the plurality of speed control buttons being connected to the transmitter chip; and the blast button being connected to the transmitter chip.

* * * * *